United States Patent
Liu et al.

(10) Patent No.: US 9,148,873 B1
(45) Date of Patent: Sep. 29, 2015

(54) METHOD AND APPARATUS FOR PROVIDING DIFFERENT TYPES OF PHYSICAL LAYER DEVICES ACCESS TO A WIRELESS MEDIUM

(71) Applicant: Marvell International Ltd., Hamilton (BM)

(72) Inventors: Yong Liu, Campbell, CA (US); Hongyuan Zhang, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 184 days.

(21) Appl. No.: 13/917,262

(22) Filed: Jun. 13, 2013

Related U.S. Application Data (60) Provisional application No. 61/668,393, filed on Jul. 5, 2012.

(51) Int. Cl.
*H04W 72/04* (2009.01)

(52) U.S. Cl.
CPC ..................... *H04W 72/04* (2013.01)

(58) Field of Classification Search
CPC .............................. H04W 48/12; H04W 74/085
See application file for complete search history.

(56) References Cited

U.S. PATENT DOCUMENTS

| | | | |
|---|---|---|---|
| 7,664,089 B2 | 2/2010 | Zhao | |
| 7,710,930 B2 | 5/2010 | Kwak | |
| 8,036,241 B2 | 10/2011 | Ji et al. | |
| 8,045,574 B2 | 10/2011 | Sherman et al. | |
| 8,121,108 B2 | 2/2012 | Kwon et al. | |
| 8,265,061 B1 | 9/2012 | Smith et al. | |
| 8,355,389 B2 | 1/2013 | Kasslin et al. | |
| 8,411,699 B2 | 4/2013 | Ohmi | |
| 8,468,615 B2 | 6/2013 | Tremp | |
| 2003/0012163 A1 | 1/2003 | Cafarelli et al. | |
| 2004/0203979 A1 | 10/2004 | Attar et al. | |
| 2004/0218555 A1 | 11/2004 | Chen et al. | |
| 2005/0047386 A1 | 3/2005 | Yi | |
| 2005/0105504 A1 | 5/2005 | Sakoda | |

(Continued)

FOREIGN PATENT DOCUMENTS

| | | |
|---|---|---|
| EP | 1513295 A2 | 3/2005 |
| EP | 1553730 A1 | 7/2005 |

(Continued)

OTHER PUBLICATIONS

U.S. Appl. No. 13/680,831, Liu, filed Nov. 19, 2012.

(Continued)

*Primary Examiner* — Jeffrey M Rutkowski
*Assistant Examiner* — Thomas D Busch (57) ABSTRACT

A wireless network includes a first station and a second station. The first station includes a media access control circuit configured to provide a frame of data to be transmitted on a communication channel, and a physical layer device configured to receive the frame of data and transmit the frame of data on the communication channel. The frame of data is transmitted according to a first short interframe space (SIFS) or a second SIFS, and the first SIFS has a duration that is different from that of the second SIFS. The second station is configured to determine whether the first station transmitted the frame of data according to the first SIFS or the second SIFS and transmit a response to the frame of data based on the determination of whether the first station transmitted the frame of data according to the first SIFS or the second SIFS.

18 Claims, 8 Drawing Sheets

(56) References Cited

U.S. PATENT DOCUMENTS

| | | | |
|---|---|---|---|
| 2006/0187964 A1 | 8/2006 | Li et al. | |
| 2007/0025244 A1 | 2/2007 | Ayyagari et al. | |
| 2007/0041353 A1 | 2/2007 | Li et al. | |
| 2007/0076675 A1 | 4/2007 | Chen | |
| 2007/0160021 A1 | 7/2007 | Xhafa et al. | |
| 2007/0217378 A1* | 9/2007 | Moorti et al. | 370/338 |
| 2007/0280246 A1 | 12/2007 | Berkman et al. | |
| 2007/0286222 A1 | 12/2007 | Balasubramanian | |
| 2008/0144558 A1 | 6/2008 | Wentink | |
| 2008/0146253 A1 | 6/2008 | Wentink | |
| 2008/0151814 A1 | 6/2008 | Jokela | |
| 2008/0240049 A1 | 10/2008 | Gaur | |
| 2008/0247376 A1 | 10/2008 | Del Prado Pavon et al. | |
| 2008/0310391 A1 | 12/2008 | Schneidman et al. | |
| 2009/0010191 A1 | 1/2009 | Wentink | |
| 2009/0016306 A1 | 1/2009 | Wang et al. | |
| 2009/0109887 A1 | 4/2009 | Chandra et al. | |
| 2009/0196163 A1 | 8/2009 | Du | |
| 2009/0196212 A1 | 8/2009 | Wentink | |
| 2010/0165973 A1 | 7/2010 | Su et al. | |
| 2010/0192001 A1 | 7/2010 | Cornwall et al. | |
| 2010/0278088 A1 | 11/2010 | Goldman | |
| 2010/0309831 A1 | 12/2010 | Yeh et al. | |
| 2010/0315999 A1 | 12/2010 | Kakani et al. | |
| 2011/0026446 A1* | 2/2011 | Stacey | 370/310 |
| 2011/0122780 A1 | 5/2011 | Nieminen et al. | |
| 2011/0176521 A1 | 7/2011 | Park et al. | |
| 2011/0268054 A1 | 11/2011 | Abraham et al. | |
| 2012/0106418 A1 | 5/2012 | Xhafa et al. | |
| 2012/0120858 A1 | 5/2012 | Das et al. | |
| 2012/0147800 A1 | 6/2012 | Park et al. | |
| 2012/0159001 A1 | 6/2012 | Liu et al. | |
| 2012/0219099 A1 | 8/2012 | Loukianov | |
| 2012/0263094 A1 | 10/2012 | Wentink | |
| 2012/0302184 A1 | 11/2012 | Zaitsu | |
| 2012/0315943 A1 | 12/2012 | Chu et al. | |
| 2013/0176902 A1 | 7/2013 | Wentink et al. | |
| 2013/0258931 A1 | 10/2013 | Gonikberg et al. | |
| 2014/0119268 A1 | 5/2014 | Chu et al. | |
| 2014/0153463 A1 | 6/2014 | Park et al. | |

FOREIGN PATENT DOCUMENTS

| | | |
|---|---|---|
| WO | WO-2008111496 A2 | 9/2008 |
| WO | WO-2012122119 A1 | 9/2012 |

OTHER PUBLICATIONS

U.S. Appl. No. 13/680,876, Liu, filed Nov. 19, 2012.
LAN/MAN Standards Committee of the IEEE Computer Society. "IEEE Standard for Information Technology—Telecommunications and Information Exchange between Systems, Local and Metropolitan Area Networks—Specific Requirements Part 11: Wireless LAN Medium Access Control (MAC) and Physical Layer (PHY) Specifications." IEEE Std 802.11™-2012: 2793 pages. Mar. 29, 2012.
Park, Minyoung. "IEEE P802.11 Wireless LANs Proposed Specification Framework for TGah." TGac Spec Framework. 13 pages. Mar. 12, 2012.
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.
Multi-Rate Layered Decoder Architecture for Block LDPC Codes of the IEEE 802.11n Wireless Standard; Kiran Gunnam, Gwan Choi, Weihuang Wang, and Mark Yeary; © 2007 IEEE. (4 pages).
IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2,793 pages.

PCT Internation Search Report and Written Opinon for related Application No. PCT/US2012/066246; Jan. 23, 2013; 5 pages.
Park, Miuyoung; IEEE P802.11; Jul. 2012; 32 pages.
Ghosh, Chittabrata et al.; Restricted Access Window Signaling for Uplink Channel Access; Jul. 16, 2012; 13 pages.
Liu, Siyang et al.; DCF Enhancements for Large Number of STAs; Sep. 15, 2011; 11 pages.
Revolution Wi-Fi The Wireless Professional's Connection for Independent Analysis; Wireless QoS Part 1—Background Information; Jul. 28, 2010; 11 pages.
Mangold, Stefan et al.; IEEE 802.11e Wireless LAN for Quality of Service; 2002; 8 pages.
de Vegt, Rolf; Potential Compromise for 802.11ah Use Case Document; IEEE 802.11-11/0457r0; Mar. 2011; 27 pages.
IEEE P802.11ac/D2.0 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: Hiqh-Speed Physical Laver in the 5 GHz Band," *The Institute of Electrical and Electronics Engineers, Inc.*, (1999).
IEEE Std 802.11b-1999/Cor 1-2001 (Corrigendum to IEEE Std 802.11 b-1999) "IEEE Standard for Information technology—Telecommunications and information exchange between systems—Local and metropolitan area networks—Specific requirements, Part11: Wireless LAN Medium Access Control (MAC) and Physical Layer (PHY) specifications, Amendment 2: Higher-speed Physical Layer (PHY) extension in the 2.4 GHz band-Corrigendum 1 ," *The Institute of Electrical and Electronics Engineers, Inc.*, Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
International Standard, ISO/IEG 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).
IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
International Search Report and Written Opinion in International Application No. PCT/US2012/034091 dated Nov. 27, 2012.
PCT International Search Report for related Application No. PCT/US2013/044473; Oct. 29, 2013; 5 pages.
International Preliminary Report on Patentability in Int'l App. No. PCT/US2012/034091, mailed Oct. 31, 2013.
Chen, "Home Network Basis: Transmission Environments and Wired/Wireless Protocols," Prentice Hall (Jul. 2003).

(56) References Cited

OTHER PUBLICATIONS

Hiertz, et al., "The IEEE 802.11 Universe," IEEE Communications Magazine, pp. 62-70, Jan. 2010.

Stacey et al., "IEEE P802.11, Wireless LANs, Proposed TGac Draft Amendment," Institute of Electrical and Electronics Engineers, doc. No. IEEE 802.11-10/1361 r3 (Jan. 2011).

Stacey et al., "Specification Framework for TGac," document No. IEEE 802.11-09/0992r20, Institute for Electrical and Electronics Engineers, pp. 1-49, Jan. 18, 2011.

IEEE Std 802.11 ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.

Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.

IEEE Std 802.11 af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.

Yu, et al. "Coverage extension for IEEE802.11 ah," The Institute of Electrical and Electronics Engineers, doc. No. IEEE 802.11-11/0035r1, (Jan. 2011).

Taghavi et al., "Introductory Submission for TGah", doc. No. IEEE 802.11-11/0062r0, Institute for Electrical and Electronics Engineers, pp. 1-5 (Jan. 14, 2011).

Zhang et al., "11 ah Data Transmission Flow," The Institute of Electrical and Electronics Engineers, doc. No. IEEE 802.11-11/1484r1, (Nov. 2011).

Vermani, et al. "Preamble Format for 1 MHz," The Institute of Electrical and Electronics Engineers, doc. No. IEEE 802.11-11/1482r2, (Nov. 2011).

Zhang et al., "1MHz Waveform in Wider BW ", The Institute of Electrical and Electronics Engineers, doc. No. IEEE 802.11-12/0309r1, (Mar. 2012).

Vermani, et al. "Spec Framework Text for PHY Numerology," The Institute of Electrical and Electronics Engineers, doc. No. IEEE 802.11-11/1311 rO, (Sep. 2011).

Low Power Capability Support for 802.11ah dated Jan. 17, 2011.

U.S. Appl. No. 61/475,776 dated Apr. 15, 2011.

Zhao, Liqiang et al.; Hybrid DCF Supporting Hybrid Antennas in a WLAN; IMACS Multiconference; Oct. 4-6, 2006.

\* cited by examiner

METHOD AND APPARATUS FOR PROVIDING DIFFERENT TYPES OF PHYSICAL LAYER DEVICES ACCESS TO A WIRELESS MEDIUM

CROSS-REFERENCE TO RELATED APPLICATIONS

This application claims the benefit of U.S. Provisional Application No. 61/668,393, filed on Jul. 5, 2012.

This application is related to Ser. No. 13/680,831, filed on Nov. 19, 2012. The entire disclosures of the applications referenced above are incorporated herein by reference.

FIELD

The present disclosure relates to access to a wireless medium in a wireless local area network.

BACKGROUND

In wireless local area networks, network devices communicate with each other over a wireless medium that is shared among the network devices. In such cases, in which a wireless medium is shared among multiple network devices, in order to avoid interference among respective transmissions of the network devices on the wireless medium, generally only one networking device should be permitted to transmit on the wireless medium at any given time. When transmissions of multiple network devices interfere on a wireless medium, such occurrences are commonly referred to as "collisions". According to IEEE Standard 802.11-2012, the entire disclosure of which is here incorporated by reference, a carrier sense multiple access with collision avoidance (CSMA/CA) scheme is therefore defined.

According to CSMA, prior to transmitting, a network device senses whether the wireless medium is busy—i.e., whether a carrier signal from another station's transmission is present on the wireless medium. If the wireless medium appears to be free based on carrier sensing, a collision avoidance scheme causes the networking device to select a randomized period of time to wait before transmitting. If the wireless medium remains free during this period of time, the network device begins transmitting upon conclusion of the period of time. The networking device expects to receive an acknowledgement from the destination of the transmission. If no acknowledgment is received, the network device may assume that a collision occurred, and therefore attempt to retry transmission later, possibly after waiting for an even longer randomized period of time.

Figure 1:
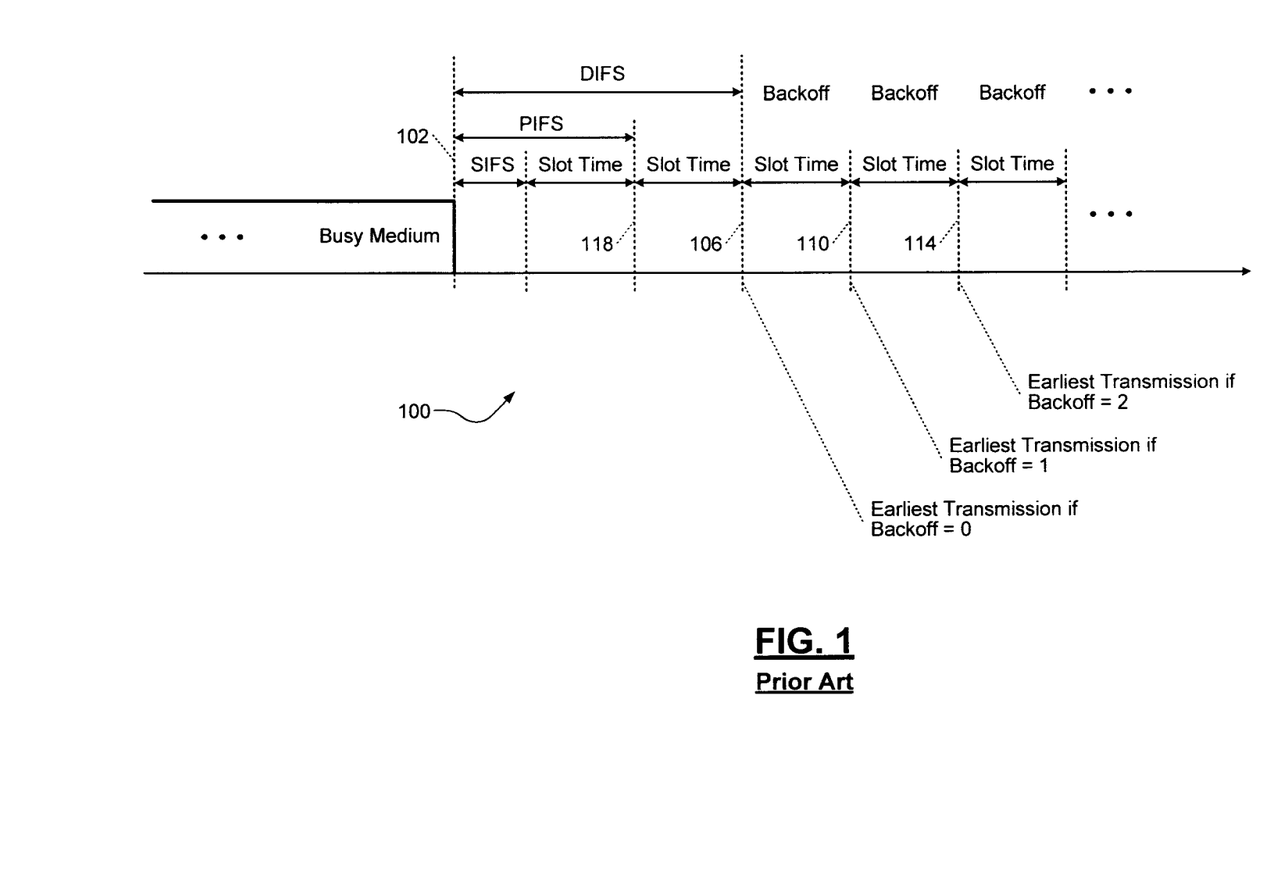
FIG. 1 is a graphical illustration of channel access timing parameters according to the prior art.

In FIG. 1, an example illustration of a collision avoidance scheme 100 consistent with IEEE 802.11 is shown. At time 102, the medium ceases to be busy. A network device that desires to transmit on the medium will initially wait for the medium to remain free for a predetermined amount of time—a delay referred to as the distributed coordination function (DCF) interframe space (DIFS)—the ending of which is represented in FIG. 1 at time 106. At the end of the DIFS, the network device randomly selects an integer that can range from zero to an upper limit. The integer randomly selected may be referred to as a backoff number, a backoff delay, or a backoff interval. The network device then additionally waits for an amount of time corresponding to the selected backoff interval and, assuming the medium continues to remain free during this time, the network device can begin transmitting on the medium.

In FIG. 1, if the randomly selected backoff interval is zero, the network device can immediately begin transmitting on the medium at time 106. If the backoff interval selected is one, the network device waits for a predetermined time period referred to as a slot time, and can begin transmitting at time 110. Similarly, if the backoff interval selected is two, the network device can begin transmitting at time 114, which time corresponds to two slot times after the end of DIFS at time 106.

As shown in FIG. 1, a duration of a DIFS (referred to herein as a "DIFS duration" corresponds to two slot times and one short interframe space (SIFS). Because network devices will normally wait a DIFS duration prior to transmitting on a medium, even if the selected backoff is zero, an access point can gain precedence over regular network devices by beginning transmission on the medium during the DIFS duration, such as at time 118. The delay from time 102 until time 118 is called a point coordination function (PCF) interframe space (PIFS). As shown in FIG. 1, a duration of a PIFS corresponds to one SIFS and one slot time.

Figure 2:
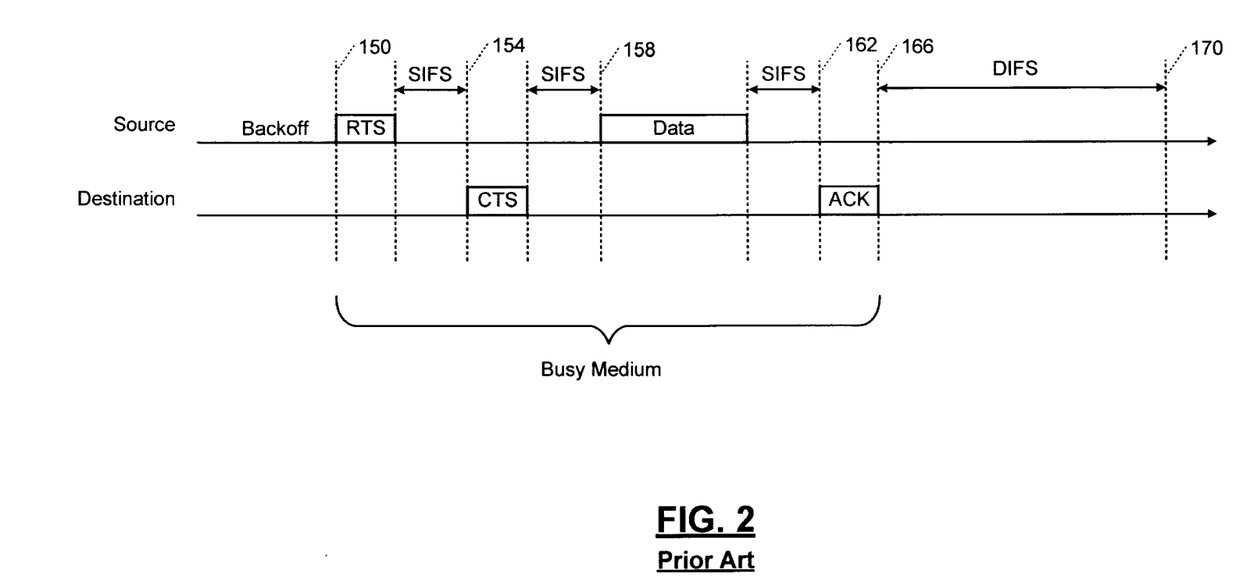
FIG. 2 is a graphical illustration of a timeline of an example transmission according to the prior art.

In FIG. 2, an example transmission following the backoff interval is shown. At time 150, a source transmits a request to send (RTS) to a destination. Following a SIFS, during which the destination processes the RTS and gets ready for transmission, the destination transmits a clear to send (CTS) frame at time 154. When the source receives a CTS frame, the source knows that the destination successfully received the RTS frame and that a collision did not occur. Because the RTS frame is relatively short, the determination of whether a collision has occurred will be much quicker than if a long data frame experienced a collision. In addition, the CTS frame signals to other network devices, which may not have received the RTS from the source, that a transmission is expected and that the medium is busy.

At time 158, after a further SIFS, the source begins transmission of data to the destination. At time 162, following another SIFS, the destination transmits an acknowledgment to the source if the destination correctly received the data. At time 166, the medium is once again free, and other network devices must wait for at least a period of DIFS until time 170 before the other network devices can begin transmission. Between time 150 and time 170, any network devices that had a non-zero backoff would have deferred decrementing their backoff until time 170. In other words, if another device had a remaining backoff of two at time 150, that backoff would begin decrementing once again at time 170. If the medium remains free, after an additional two slot times, the backoff will have decreased to zero and that network device can transmit.

In order to provide quality of service (QoS)—i.e., giving different priorities to different types of traffic—the collision avoidance scheme above, which is called the distributed coordination function (DCF), has been extended with a scheme called enhanced distributed channel access (EDCA). Under EDCA, two primary changes are made. The first is that a duration of the DIFS is effectively lengthened for lower priority traffic. In addition, the average backoff interval for lower priority traffic is lengthened. The following table includes the four access categories defined for 802.11 QoS. The lowest priority is called background, while the highest priority is called voice.

| Access Category | AC Description | CWmin | CWmin e.g. | CWmax | CWmax e.g. | AIFSN |
|---|---|---|---|---|---|---|
| AC_BK | Background | aCWmin | 15 | aCWmax | 1023 | 7 |
| AC_BE | Best Effort | aCWmin | 15 | aCWmax | 1023 | 3 |
| AC_VI | Video | (aCWmin + 1)/2 − 1 | 7 | aCWmin | 15 | 2 |
| AC_VO | Voice | (aCWmin + 1)/4 − 1 | 3 | (aCWmin + 1)/2 − 1 | 7 | 2 |

When selecting a backoff interval, the network device selects a random number between 0 and an upper limit. The upper limit is called a contention window (CW) and is initialized to a value called CWmin. When a transmission fails, likely as a result of collision, the contention window is increased, up to a limit of CWmax. The above table demonstrates that the values of CWmin and CWmax are different for different access categories.

The values of CWmin and CWmax are defined in terms of parameters aCWmin and aCWmax. Using example values of 15 for aCWmin and 1023 for aCWmax, examples of CWmin and CWmax for each access category are shown. For example, for video (AC_VI), the contention window begins at 7 where the backoff will be randomly selected from the range of 0 to 7, and after one or more retries, the backoff will be randomly chosen from the range of 0 to 15.

Figure 3:
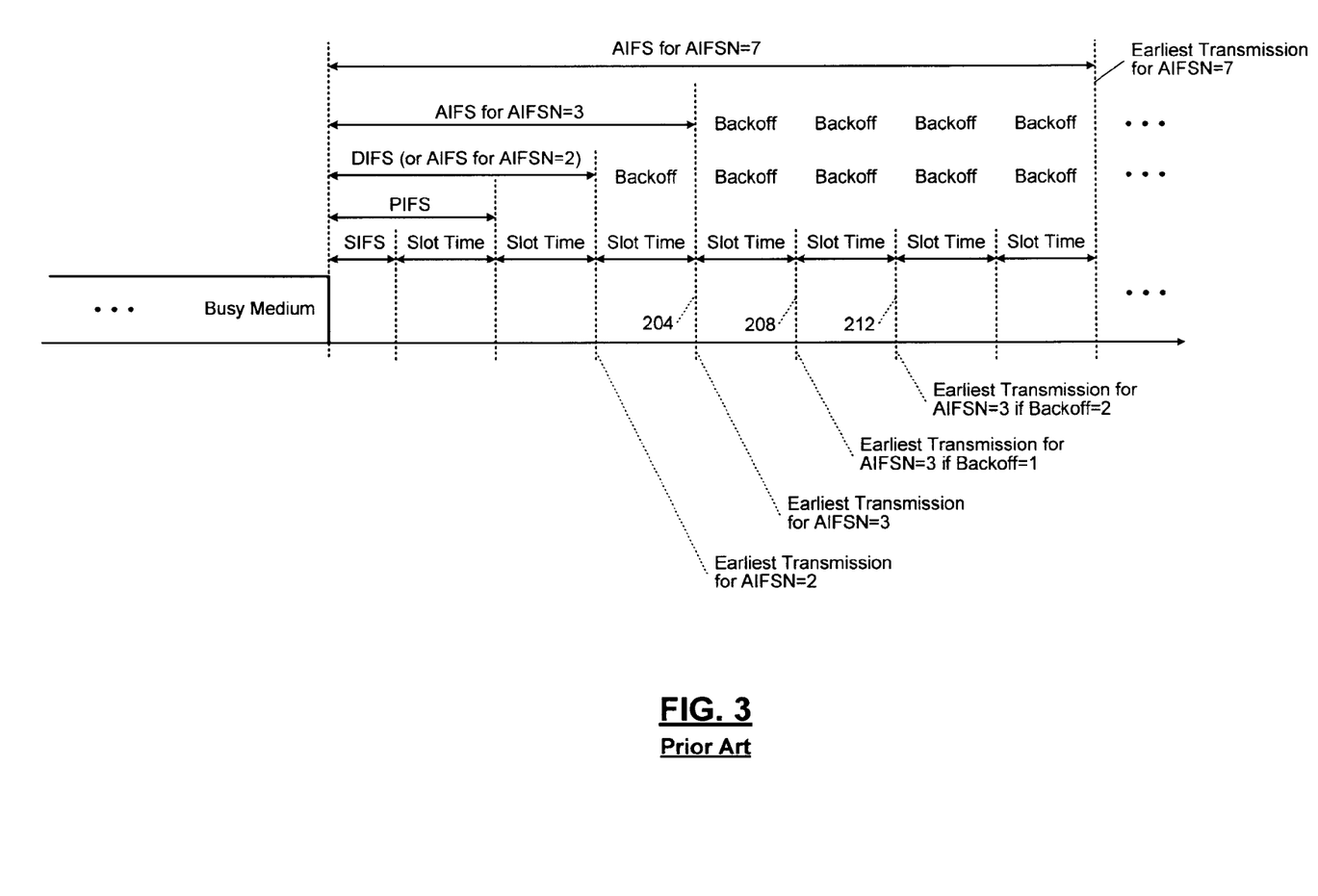
FIG. 3 is a graphical illustration of channel access timing parameters relating to quality of service according to the prior art.

The above table also has a column for arbitration interframe space number (AIFSN), which specifies the minimum time that the medium must be free before the backoff interval begins. The arbitration interframe space (AIFS) is specified by the sum of SIFS and AISFN times the slot time. As shown in FIG. 3, the duration of an AIFS for an AIFSN of two is the same as the duration of the DIFS from FIG. 1. The duration of an AIFS for an AIFSN of three is one slot time longer than the duration of the DIFS. Similarly, the duration of an AIFS for an AIFSN of 7 is five slot times longer than the duration of the DIFS. In other words, for best effort (AC_BE) frames, where the AIFSN is three, the earliest time a network device could transmit best effort data is at time 204. If the selected backoff is one, best effort traffic could be transmitted starting at time 208. Similarly, if the backoff is two, best effort traffic could begin transmitting at time 212, etc.

Using background data (AC_BK) as an example, the contention window, using the example aCWmin and aCWmax values, increases from 15 to a maximum of 1023 as retransmissions are attempted. Once the contention window reaches CWmax, the contention window remains the same for any subsequent retries. Eventually, after a certain number of retries, transmission of that frame may be abandoned. The function that specifies how the contention window increases from CWmin to CWmax may be dependent on access category. One example function, which is nearly equivalent to doubling, is (CW+1)*2−1. In other words, the contention window begins at 15 and, after an unsuccessful transmission, the CW increases to 31. After another failed transmission attempt, the contention window increases to 63, etc.

Referring again to FIG. 3, it can be observed that the total delay from the medium becoming free until a transmission begins can be expressed in terms of SIFS plus a number of slot times. SIFS is based on the nominal time that the medium access control (MAC) and physical layer interface (PHY) require in order to receive the last symbol of a frame at the air interface, process the frame, and respond with the first symbol on the air interface of the earliest possible response frame. IEEE 802.11-2012, section 6.5.4.2.

The slot time is based on four values: aMACProcessingDelay, aAirPropagationTime, aRxTxTurnaroundTime, and aCCATime. The aMACProcessingDelay value is the maximum time available for the MAC to request a transmission from the PHY after learning of the end of a reception by the PHY. The aAirPropagationTime is twice the propagation time required for a signal to cross the distance between the most distant allowable network devices. The aRxTxTurnaroundTime is the maximum time required by the PHY to change from receiving to transmitting. The aCCATime is the maximum time that a clear channel assessment (CCA) mechanism has available to determine whether the medium is busy or idle. See IEEE 802.11-2012, section 6.5.4.2. For purposes of illustration only, examples of these values in the 5 GHz band are 9 μs for slot time, 16 μs for SIFS, and 4 μs for aCCATime.

SUMMARY

A wireless network includes a first station and a second station. The first station includes a media access control circuit configured to provide a frame of data to be transmitted on a communication channel, and a physical layer device configured to receive, from the media access control circuit, the frame of data, and transmit the frame of data on the communication channel. The frame of data is transmitted according to a first short interframe space (SIFS) or a second SIFS, wherein the first SIFS has a duration that is different from that of the second SIFS. The second station is configured to determine whether the first station transmitted the frame of data according to the first SIFS or the second SIFS and transmit a response to the frame of data based on the determination of whether the first station transmitted the frame of data according to the first SIFS or the second SIFS.

A method of operating a wireless network including a first station and a second station includes transmitting, using a physical layer device of the first station, a frame of data on a communication channel, wherein the frame of data is transmitted according to a first short interframe space (SIFS) or a second short interframe space (SIFS), and wherein the first short interframe space (SIFS) has a duration that is different from that of the second short interframe space (SIFS), and at the second station, determining whether the first station transmitted the frame of data according to the first SIFS or the second SIFS and transmitting a response to the frame of data based on the determination of whether the first station transmitted the frame of data according to the first SIFS or the second SIFS.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

For different physical layer interfaces (PHYs), various timing parameters may be different. For example, IEEE Standard 802.11ah (currently in the process of being drafted) may specify a 1 MHz channel PHY and a 2 MHz channel PHY. The clear channel assessment (CCA) time, known as aCCA-Time, may be different for these two PHYs. This will result in the short interframe space (SIFS) intervals, as well as the slot times, being different for the PHYs.

For purposes of illustration only, the preamble of a 1 MHz PHY (see FIG. 4A) may have a 4-symbol short training field (STF) 304, where each symbol is 40 μs long, while the preamble of a 2 MHz PHY (see FIG. 4B) may have a 2-symbol short training field 312. The symbols in the 2 MHz PHY preamble may also be 40 μs in length. The aCCATime may be based on the time required to receive half of a short training field and may therefore be approximately 40 μs for the 2 MHz PHY and 80 μs for the 1 MHz PHY. Because of the longer aCCATime, the 1 MHz PHY will have a longer SIFS as well as longer slot times. When the 1 MHz and 2 MHz PHYs are sharing the same wireless channel, 2 MHz transmissions are more likely to occur than 1 MHz transmissions because the channel access times are on average shorter for the 2 MHz transmissions. This may lead to higher priority data transmitted using the 1 MHz PHY receiving a worse quality of service (QoS) than lower priority data sent using the 2 MHz PHY.

One approach is to use the longer 1 MHz channel access times (SIFS and slot times) for both 1 MHz and 2 MHz transmissions. However, this approach would cause all 2 MHz transmissions to be delayed, even if there are no 1 MHz transmissions pending. Therefore, in situations where 1 MHz traffic is not present, an access point (AP) may allow network devices (also known as stations or STAs) to make 2 MHz transmissions using shorter channel access times specific to the 2 MHz PHY.

When 1 MHz transmissions are present, comparable quality of service for the same access category (i.e., QoS priority) between 1 MHz and 2 MHz PHYs can be achieved by using channel access parameters based on the 1 MHz PHY requirements. The channel access parameters include the arbitration interframe space (AIFS) for each access category and contention window parameters for each access category. The channel access parameters can be made the same by using the same SIFS and slot times for both 1 MHz and 2 MHz transmissions.

Alternatively, the slot times for 2 MHz transmissions can be made shorter than the slot times for the 1 MHz transmissions, and the durations of the AIFS and contention windows can be equalized by increasing the multipliers (AISFN, aCWmin, and aCWmax) for 2 MHz transmission with respect to 1 MHz transmissions. In other words, if the 2 MHz slot time is half as long as the 1 MHz slot time, the AIFSNs for 2 MHz transmissions may be doubled with respect to 1 MHz transmissions. Because the duration of the AIFS is the product of AIFSN and slot time, the halving and doubling cancel out, resulting in the same AIFS for each access category between 1 MHz and 2 MHz transmissions.

In situations where 2 MHz channels may be plentiful, such as the United States, 2 MHz transmissions may be more common than 1 MHz transmissions. Further, 1 MHz transmissions are generally used for longer range transmission, and may therefore be less likely to interfere with 2 MHz transmissions. In such circumstances, 2 MHz transmissions may be conducted using the shorter channel access parameters specific to 2 MHz transmissions.

Another approach to resolving conflicts between a 1 MHz PHY and a 2 MHz PHY is to time-multiplex the wireless channel. For example only, a restricted access window can be used, as described in detail in commonly assigned application Ser. No. 13/680,876, filed on Nov. 19, 2012, the entire disclosure of which is here incorporated by reference.

The AP may specify a restricted access window following a beacon, where 1 MHz channel access parameters are used during the restricted access window period. Outside of the restricted access window, 2 MHz channel access parameters are used. This may mean that 1 MHz transmissions are constrained to only occur within the restricted access window. Alternatively, the restricted access window could be specified to use 2 MHz channel access parameters, meaning that 1 MHz transmissions would not occur during the restricted access window. Outside of the restricted access window, 1 MHz times would then be used. 2 MHz transmissions may be allowed as long as the 2 MHz transmissions were performed using 1 MHz channel access parameters.

A wireless network may support two or more types of PHYs (e.g., a 1 MHz PHY using a preamble having a first length, and a 2 MHz PHY using a preamble having a second length) and two or more respective SIFS lengths. For example, a first SIFS corresponds to a 1 MHz PHY while a second SIFS, which has a duration shorter than the first SIFS, corresponds to a 2 MHz PHY. Each of the different types of PHYs may be assigned the same slot time. For example, a typical slot time for a 1 MHz PHY may be approximately 77 μs while a typical slot time for a 2 MHz PHY may be approximately 67 μs. Because the slot times are similar, a longer slot time (e.g., 80 μs) may be used by both PHY types without significantly affecting efficiency.

In one approach, two different SIFS times including a regular (i.e., contention) SIFS and a short SIFS are defined. The contention SIFS may be based on a first, slower clock rate (e.g., a slowest clock rate of all supported PHY types). For example, the contention SIFS may be based on a 1 MHz PHY (e.g., 160 or 200 μs). Other IFSs (e.g., PIFS, DIFS, AIFS, EIFS, etc.) are calculated based on the contention IFS and the slot time. An example slot time is 80 μs. A backoff window is also based on this slot time. All supported types of PHYs use the same contention SIFS during contention for medium access. Accordingly, a delay associated with the contention for medium access is the same regardless of the type of PHY.

Conversely, the short SIFS is based on a second, faster clock rate. For example, the short SIFS may be based on a 2 MHz PHY (e.g., 80 or 120 μs). The short SIFS is used by all PHY types during a transmission sequence. In other words, after any PHY gains access to the medium during contention using the contention SIFS, that PHY uses the short SIFS during the subsequent transmission sequence.

In a wireless network according to the principles of the present disclosure, both a regular SIFS and a short SIFS are supported. In one implementation, the short SIFS is associated with certain predetermined bandwidths and/or modulation and coding schemes (MCSs). In another implementation, a transmitted frame includes an indicator (e.g., in a signal or other field) of whether the associated network device (e.g., an access point or client station) is using the regular SIFS or the short SIFS. In still another implementation, a network device may transmit using either the regular SIFS or the short SIFS based on its capability. The first network device is configured to be prepared to receive a response after either the regular SIFS or the short SIFS based on the capability of a responding second network device, which is unknown to the first network device. A third network device is configured to defer its own channel access until after the regular IFS to ensure the second network device has sufficient time to access the channel.

Figure 4A:
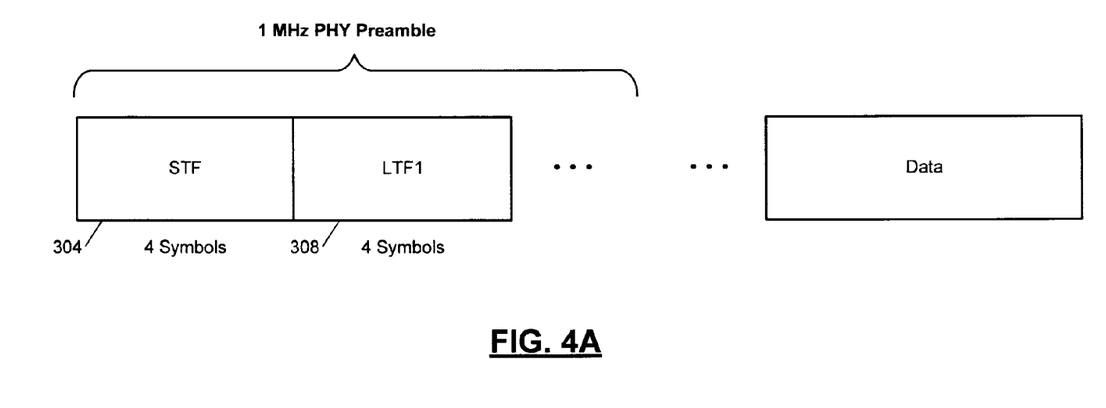
FIGS. 4A and 4B are graphical illustrations of physical layer preambles for 1 MHz and 2 MHz transmissions.

In FIG. 4A, an example 1. MHz PHY preamble is shown. The preamble includes a short training field (STF) 304 with four symbols and a first long training field (LTF) 308, also with four symbols. For example only, each symbol may be 40 µs in length.

Figure 4B:
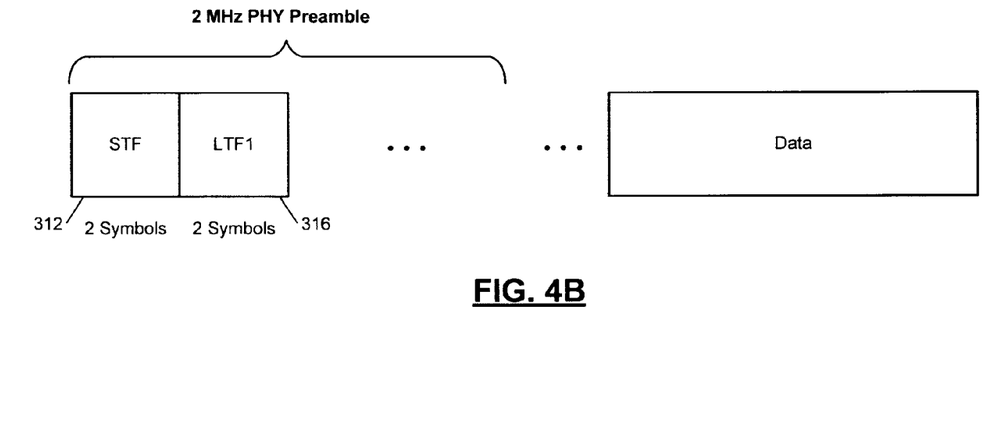

In FIG. 4B, an example 2 MHz PHY preamble is shown. The preamble includes a short training field (STF) 312 with two symbols and a first long training field (LTF) 316, also with two symbols. For example only, each symbol may be 40 µs in length.

Figure 5A:
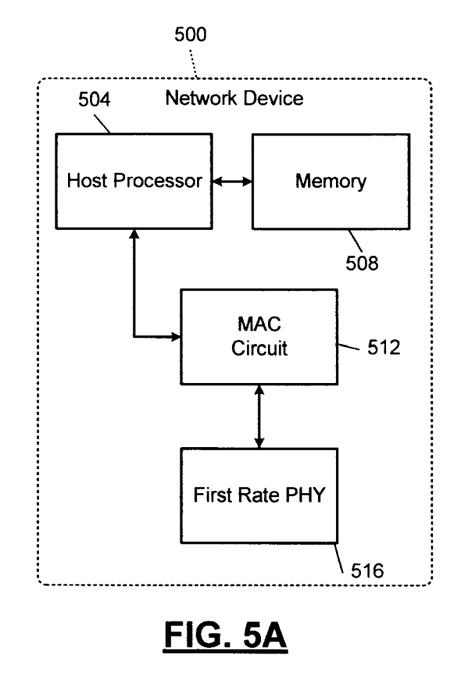
FIGS. 5A-5D are functional block diagrams of example network devices.

FIGS. 5A, 5B, 5C, and 5D illustrate example network devices configured to operate in a wireless network according to the principles of the present disclosure. In FIG. 5A, a first example network device 500 includes a host processor 504 that interfaces with memory 508. The host processor 504 sends data to and receives data from a medium access control (MAC) circuit 512. The MAC circuit 512 communicates with a wireless medium using a first rate physical layer interface (PHY) 516. For example only, the first rate PHY 516 may operate with 1 MHz channels. A 1 MHz channel may span the higher frequency half of a 2 MHz channel or the lower frequency half of the 2 MHz channel.

Figure 5B:
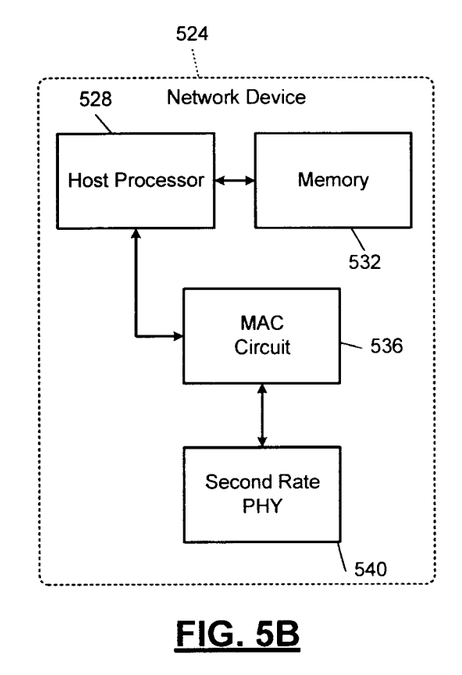

In FIG. 5B, a second example network device 524 includes a host processor 528 that interfaces with memory 532. The host processor 528 sends data to and receives data from a medium access control (MAC) circuit 536. The MAC circuit 536 communicates with a wireless medium using a second rate PHY 540. For example only, the second rate PHY 540 may operate with 2 MHz channels.

Figure 5C:
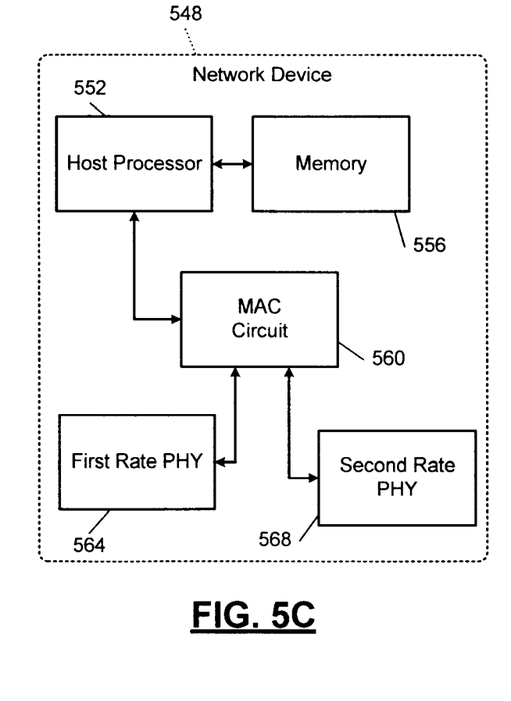

In FIG. 5C, a third example network device 548 includes a host processor 552 that interfaces with memory 556. The host processor 552 sends data to and receives data from a medium access control (MAC) circuit 560. The MAC circuit 560 communicates with a wireless medium using a first rate PHY 564 and also interacts with the wireless medium using a second rate PHY 568. For example only, the first rate PHY 564 may operate with 1 MHz channels, while the second rate PHY 568 may operate with 2 MHz channels.

Figure 5D:
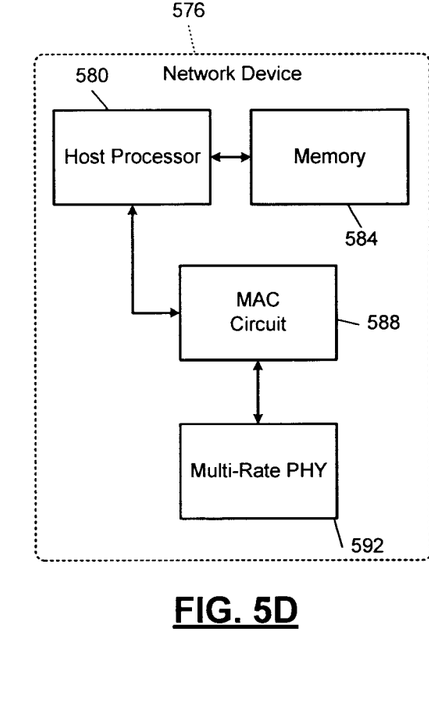

In FIG. 5D, a fourth example network device 576 includes a host processor 580 that interfaces with memory 584. The host processor 580 sends data to and receives data from a medium access control (MAC) circuit 588. The MAC circuit 588 communicates with a physical layer medium using a multi-rate PHY 592, which may support both 1 MHz and 2 MHz channel communication.

Figure 6:
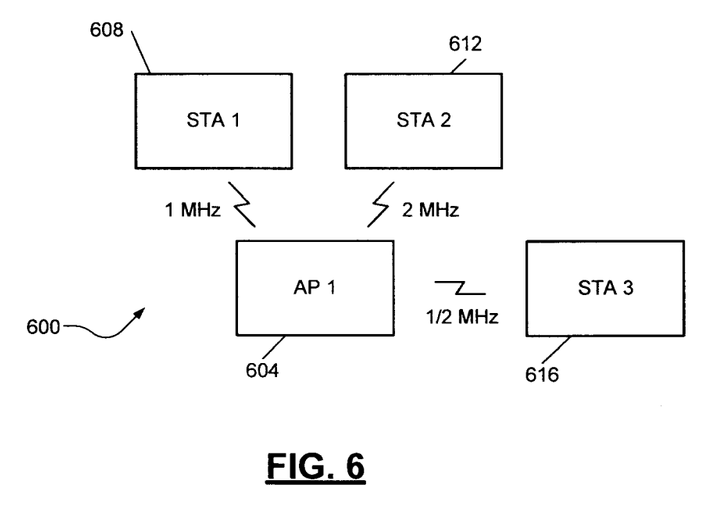
FIG. 6 is an example network.

In FIG. 6, an example wireless network 600 includes an access point (AP) 604, a first wireless network device (e.g., a first station) 608, a second station 612, and a third station 616. The AP 604 forms an infrastructure basic service set (BSS) with the first station 608, the second station 612, and the third station 616. The AP 604 and the stations 608, 612, and 616 may correspond to, for example, any of the network devices 500, 524, 548, and/or 576 as described in FIGS. 5A-5D. For example only, the AP 604 communicates with the first station 608 using a 1 MHz channel, with the second station 612 using a 2 MHz channel, and with the third station 616 using a 1 or 2 MHz channel.

In a first implementation where a short SIFS is associated with predetermined bandwidths and/or selected MCSs, a station having 2 MHz capability (e.g., one of the stations 612 and 616) may transmit using an MCS associated with the short SIFS. For example, devices operating in the network 600 may store data (e.g., a lookup table) indicative of which bandwidths/MCSs are associated with the short SIFS, and/or may be informed of associations between the short SIFS and selected bandwidths/MCSs by the AP 604. Alternatively, one of the stations 612 and 616 may transmit using a 2 MHz or greater bandwidth channel.

Accordingly, the transmitting station may expect a receiving station (e.g., the AP 604) to send a response after the duration of the short SIFS. Or, if a response is not expected/needed, the transmitting station may send another transmission in a sequence after the short SIFS. Conversely, if the transmitting station does not have 2 MHz capability (e.g., the station 608) or has 2 MHz capability but nonetheless opts to transmit on a 1 MHz channel, then the transmitting station may expect a receiving station to send a response after the duration of the regular SIFS. Or, if a response is not expected/needed, the transmitting station may send another transmission in a sequence after the duration of the regular SIFS.

In this manner, any station transmitting using channels (e.g., 2 MHz or greater) or MCSs associated with the short SIFS operate according to an expectation that a receiving station will also operate according to the duration of the short SIFS if the receiving station responds using the same channel or MCS. Conversely, stations that do not support the short SIFS (e.g., not having 2 MHz capability) are not able/permitted to use channels (e.g., 2 MHz bandwidth) or MCSs associated with the short SIFS. Third-party stations (e.g., stations in the network 600 other than the transmitting station in a receiving station) may determine whether the transmitting station and the receiving station are communicating using the short SIFS and defer channel access accordingly. For example, the frame transmitted by the transmitting station (and received by third-party stations in addition to the receiving station) may include an indicator of which bandwidth/MCS was used in the transmission. For example only, the frame may include the indicator in the signal field (SIG). Accordingly, all of the stations in the network 600 are aware that the transmitting station is using the short SIFS.

In a second implementation where a transmitted frame includes an SIFS indicator (e.g., in the signal field SIG) of which SIFS the transmitting device is using, selected bandwidths/channels and/or MCSs are not automatically associated with a particular SIFS. Instead, each of the stations 608, 612, and 616 individually indicates its own capability and/or intent to use the short SIFS or the regular SIFS. For example, when a transmitting station communicates with a receiving station, the transmitting station may include the SIFS indicator in the transmitted frame (e.g., if a response is expected/needed). For example, the SIFS indicator may include a bit that is set (e.g., to 1) if the short SIFS is being used and not set (e.g., set to 0) if the regular SIFS is being used. The receiving station transmits a response after the duration of the short SIFS or the duration of the regular SIFS according to the SIFS indicator.

As in the first implementation, third-party stations may determine whether the transmitting station and the receiving station are communicating using the short SIFS or the regular SIFS and defer channel access accordingly. For example, the third-party stations determine whether the transmitting station and the receiving station are communicating using the short SIFS or the regular SIFS based on the SIFS indicator. Accordingly, all of the stations in the network 600 are aware of whether the transmitting station and the receiving station are using the short SIFS or the regular SIFS.

In a third implementation, a transmitted data frame may not include any indication of whether the short SIFS or the regular SIFS is being used. Further, the short SIFS is not associated with predetermined bandwidths and/or selected MCSs. Instead, each of the stations operating in a network 600 is configured to determine whether other stations are using the short SIFS or the regular SIFS. For example, a transmitting station may choose to transmit a frame using the short SIFS or the regular SIFS based on its own capability and/or transmission conditions (e.g., channel, noise, and/or environmental conditions). For example only, the transmitting station may transmit a frame using the short SIFS. A receiving station, however, may or may not have short SIFS capability. Accordingly, the transmitting station should be prepared to receive a response from the receiving station after either the duration of the regular SIFS or the duration of the short SIFS. In other words, if the transmitting station still has not received a response after the duration of the short SIFS, and the transmitting station continues to wait until after the duration of the regular SIFS. Similarly, third-party stations also defer channel access until after the duration of the regular SIFS.

In any of the implementations described, any of the stations 608, 612, and 616 may store data indicative of known capabilities of others of the stations. For example, the each of the stations 608, 612, and 616 may store a table identifying which stations have 2 MHz (e.g., short SIFS) capability and which stations only have 1 MHz (e.g., regular SIFS) capability. Accordingly, when one of the stations transmits or receives a data frame intended for itself or another station, that station knows whether to expect a response after the duration of the short SIFS or the duration of the regular SIFS, and/or whether to defer channel access until after the duration of the short SIFS or the duration of the regular SIFS.

Figure 7:
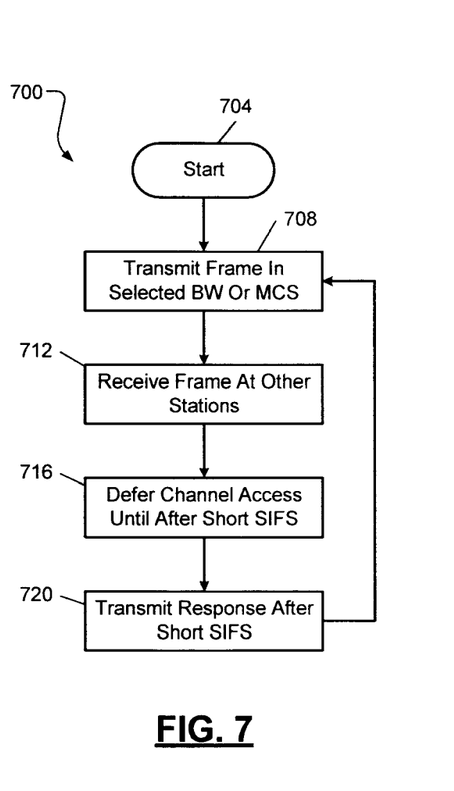
FIGS. 7-9 are flowcharts of example SIFS operation.

As shown in FIG. 7, in an example short SIFS method 700 beginning at 704, a short SIFS is associated with predetermined bandwidths and/or selected MCSs. At 708, a transmitting station transmits a data frame using a bandwidth or MCS associated with the short SIFS. At 712, one or more other stations including a receiving station and third-party stations receive the data frame. At 716, third-party stations defer channel access until after the duration of the short SIFS. At 720, the receiving station transmits a response to the data frame after the duration of the short SIFS.

Figure 8:
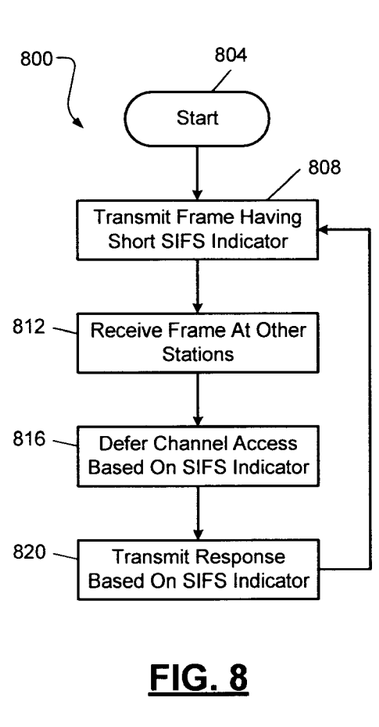

As shown in FIG. 8, in another example short SIFS method 800 beginning at 804, data frames include an SIFS indicator. At 808, a transmitting station transmits a data frame having the SIFS indicator. At 812, one or more other stations including a receiving station and third-party stations receive the data frame. At 816, third-party stations defer channel access until after the duration of the short SIFS or the duration of the regular SIFS based on the SIFS indicator. At 820, the receiving station transmits a response to the data frame after the duration of the short SIFS or the duration of the regular SIFS based on the SIFS indicator.

Figure 9:
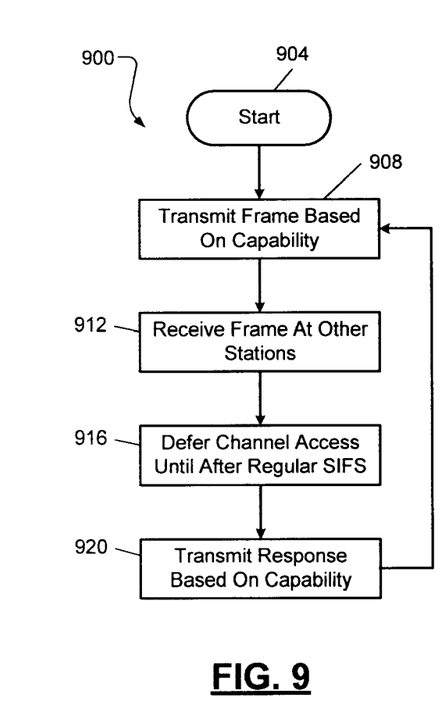

As shown in FIG. 9, another example short SIFS method 900 beginning at 904. At 908, a transmitting station transmits a data frame after the duration of the short SIFS or the duration of the regular SIFS based on its own capability (e.g., based on whether the transmitting station includes a 2 MHz PHY or a 1 MHz PHy). At 912, one or more other stations including a receiving station and third-party stations receive the data frame. At 916, third-party stations defer channel access until after the duration of the regular SIFS. At 920, the receiving station transmits a response to the data frame after the duration of the short SIFS or the duration of the regular SIFS based on its own capability.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A wireless network, comprising:
   a first station, comprising
      a media access control circuit configured to provide a frame of data to be transmitted on a communication channel; and
      a physical layer device configured to
         receive, from the media access control circuit, the frame of data, and
         transmit the frame of data on the communication channel, wherein the physical layer device is configured to transmit the frame of data according to a first short interframe space (SIFS), and the physical layer device is also configured to transmit the frame of data according to a second short interframe space (SIFS), and wherein the first short interframe space (SIFS) has a duration that is different from that of the second short interframe space (SIFS),
   wherein the first SIFS associated with at least one of i) a first bandwidth of a plurality of bandwidth and ii) a first modulation and coding scheme of a plurality of modulation and coding schemes; and
   a second station configured to i) determine, using stored or received information indicating that the first SIFS is associated with the at least one of the first bandwidth and the first modulation and coding scheme, which of the first SIFS and the second SIFS the first station used to transmit the frame of data, and ii) transmit a response to the frame of data based on determination of which of the first SIFS and the second SIFS the first station used to transmit the frame of data.

2. The wireless network of claim 1, wherein the first bandwidth is greater than or equal to 2 MHz.

3. The wireless network of claim 1, wherein the determination is made at the second station based on a determination that the first station transmitted the frame of data using the first bandwidth or the first modulation and coding scheme.

4. The wireless network of claim 1, and further comprising:
   a third station configured to i) determine whether the first station transmitted the frame of data according to the first SIFS or the second SIFS, and ii) defer access to the communication channel based on the determination.

5. The wireless network of claim 1, wherein the frame of data transmitted by
   the first station includes an indicator of whether the first station transmitted the frame of data according to the first SIFS or the second SIPS.

6. The wireless network of claim 5, wherein the determination is made, at the second station, based on the indicator.

7. The wireless network of claim 5, and further comprising:
   a third station configured to i) determine whether the first station transmitted the frame of data according to the first SIFS or the second SIFS based on the indicator, and ii) defer access to the communication channel based on the determination.

8. The wireless network of claim 1, wherein the first SIM is shorter than the second SIFS.

9. The wireless network of claim 1, wherein the first SIFS is associated with a first, type of physical layer device and the second SIFS is associated with a second type of physical layer device.

10. A method of operating a wireless network including a first station and a second station, the method comprising:
    transmitting, using a physical layer device of the first station, a frame of data on a communication channel, wherein the first physical layer device is configured to transmit the frame of data according to a first short interframe space (SIFS) and is also configured to transmit the frame of data according to a second short interframe space (SIFS), and wherein the first short interframe space (SIFS) has a duration that is different from that of the second short interframe space (SIFS),
    wherein the first SIFS is associated with at least one of i) a first bandwidth of a plurality of bandwidths and ii) a first modulation and coding scheme of a plurality of modulation and coding schemes;
    at the second station,
        determining, using stored or received information indicating that the first SIFS is associated with the at least one of the first bandwidth and the first modulation and coding scheme, which of the first SIPS and the second SIPS the first station used to transmit the frame of data, and
        transmitting a response to the frame of data based on the determination of which of the first SIFS and the second SIFS and the first station used to transmit the frame of data.

11. The method of claim 10, wherein the first bandwidth is greater than or equal to 2 MHz.

12. The method of claim 10, wherein the determination is made at the second station based on a determination that the first station transmitted the frame of data using the first bandwidth or the first modulation and coding scheme.

13. The method of claim 10, and further comprising:
    at a third station, determining whether the first station transmitted the frame of data according to the first SIFS or the second SIFS, and deferring access to the communication channel based on the determination.

14. The method of claim 10, wherein the frame of data transmitted by the first station includes an indicator of whether the first station transmitted the frame of data according to the first SIFS or the second SIFS.

15. The method of claim 14, wherein the determination is made, at the second station, based on the indicator.

16. The method of claim 14, and further comprising:
    at a third station, determining whether the first station transmitted the frame of data according to the first SIFS or the second SIFS based on the indicator, and deferring access to the communication channel based on the determination.

17. The method of claim 10, wherein the first SIFS is shorter than the second SIFS.

18. The method of claim 10, wherein the first SIFS is associated with a first type of physical layer device and the second SIFS is associated with a second type of physical layer device.

* * * * *